US005128858A

United States Patent [19]

Kitabata

[11] Patent Number: 5,128,858

[45] Date of Patent: Jul. 7, 1992

[54] PAPER FEED CONTROL DEVICE FOR A PRINTER AND METHOD FOR CONTROLLING SAME

[75] Inventor: Kazuo Kitabata, Suwa, Japan

[73] Assignee: Seiko Epson Corporation, Tokyo, Japan

[21] Appl. No.: 439,129

[22] Filed: Nov. 17, 1989

[30] Foreign Application Priority Data

Nov. 18, 1988 [JP] Japan ................................ 63-291493

[51] Int. Cl.[5] ................................ G05B 19/40

[52] U.S. Cl. ................................ 364/148; 400/550; 395/101

[58] Field of Search ................ 364/519, 148; 400/550, 400/568, 545, 902

[56] References Cited

U.S. PATENT DOCUMENTS

| | | | |
|---|---|---|---|
| 3,643,039 | 2/1972 | Barcomb et al. | 400/902 |
| 4,114,750 | 9/1978 | Baeck et al. | 400/902 |
| 4,605,887 | 8/1986 | Boella et al. | 400/568 |
| 4,644,372 | 2/1987 | Hirota | 346/138 |
| 4,671,683 | 6/1987 | Ueno | 400/61 |
| 4,834,564 | 5/1989 | Oda | 400/568 |

FOREIGN PATENT DOCUMENTS

| | | |
|---|---|---|
| 52685 | 3/1984 | Japan . |
| 132653 | 6/1987 | Japan . |
| 27278 | 2/1988 | Japan . |

*Primary Examiner*—Jerry Smith
*Assistant Examiner*—Patrick D. Muir
*Attorney, Agent, or Firm*—Blum Kaplan

[57] ABSTRACT

A controller for controlling feeding of paper in a printer in response to a plurality of feed control commands. The printer includes a detector for detecting the presence or absence of paper in the printer wherein a predetermined region remains on the paper at a point in time when the output of the detector switches from an indication of paper presence to an indication of paper absence. The printing control calculates an accumulated value of the paper feed amounts specified by the plurality of paper feed control commands when the commands are successively given. The printing control then predetermines the presence or absence of the printable region based upon an amount corresponding to the printable region and the accumulated value. The paper feed control causes paper to be fed by the accumulated value when the remainder of the predetermined printable region is predetermined to be present and to be fed by an amount corresponding to the predetermined print region when the remainder is predetermined to be absent.

6 Claims, 4 Drawing Sheets

PAPER FEED CONTROL DEVICE FOR A PRINTER AND METHOD FOR CONTROLLING SAME

BACKGROUND OF THE INVENTION

The present invention relates to an apparatus for controlling the paper feed operation in a printer, and, in particular, to a device and method for controlling a paper feed motor which operates in response to control commands from a host computer.

An apparatus for controlling a paper feed motor of a printer is known in the art. The conventional device receives control commands which are output in succession from a host computer. This causes a conventional printer to repeat a motor driving pattern as shown in FIG. 1 of the drawings in which the motor is accelerated in a time region a, driven at a constant speed in time region b, decelerated during a time period c and stops during a time period d. A paper feed motor ("PF motor") is driven in accordance with each control command. In order to print within a paper space which is suitable for printing, at the end of each series of paper feeding commands, it is determined whether printing is currently being conducted within the printable area. Once this judgement is made, a subsequent print and feed operation is executed in sequence as above as long as it is determined after each sequence that printing is still occurring within the printable area.

The conventional paper feed devices have been satisfactory. However, it becomes necessary to conduct motor acceleration in time period a, constant speed operation in time period b, deceleration in time period c and stopping of the motor in time period d for the PF motor each time the control commands are input from the host computer and then repeat them for each successive line. Accordingly, an unnecessary amount of time for acceleration and deceleration is repeatedly utilized for each line. The unnecessary time increases in proportion to an increase in the number of lines to be repeated. This reduces the actual printing speed of the printer which depends on the driving time of the PF motor.

Accordingly, it desired to provide a paper feed control device and method which eliminates this waste of time, thereby improving actual printing speed of the printer by accumulating the paper feed amount specified by the control commands and then utilizing this accumulated value at a specified time.

SUMMARY OF THE INVENTION

Generally speaking, in accordance with the present invention, a control device which executes paper feeding in a printer in accordance with paper feed control commands and output from a detector which detects the presence or absence of paper within the printer positioned so that a determinable printable space remains on the paper when the output of the detector changes from a showing of a paper presence to a showing of a paper absence, is provided. The control device includes a CPU to calculate an accumulated value of paper feed amounts specified by a plurality of paper feed control commands when these control commands are successively output and predetermine the presence or absence of the printable space remaining on the paper after the paper has been fed the accumulated value which is determined by at least a predetermined amount and the accumulated value. A control motor driving circuit executes the paper feed in response to the accumulated value when a remaining printable space is determined to exist, while executing the paper feed by an amount related to the predetermined amount when a printable space no longer remains on the paper.

When a plurality of paper feed control commands are successively given, the paper feed amounts specified by these control commands are accumulated. The paper is then fed by a value obtained from the accumulation and a single paper feed sequence including acceleration, constant speed operation and deceleration of the PF motor is performed. Whether or not a printable space will remain on the paper after the paper has been fed in accordance with the accumulated value is predetermined prior to execution of the feeding step. The paper is fed by the accumulated value only when the predetermined printable space remains on the paper.

Accordingly, it is an object of the invention to provide an improved paper feed control for a printer.

It is another object of the invention to remove the time wasted due to repetition of acceleration and deceleration of the PF motor for each successive line.

Yet another object of the invention is to prevent printing without the printable area of paper as well as preventing the paper from slipping from the platen during the course of execution of the paper feed.

Still other objects and advantages of the invention will in part be obvious and will in part be apparent from the specification.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
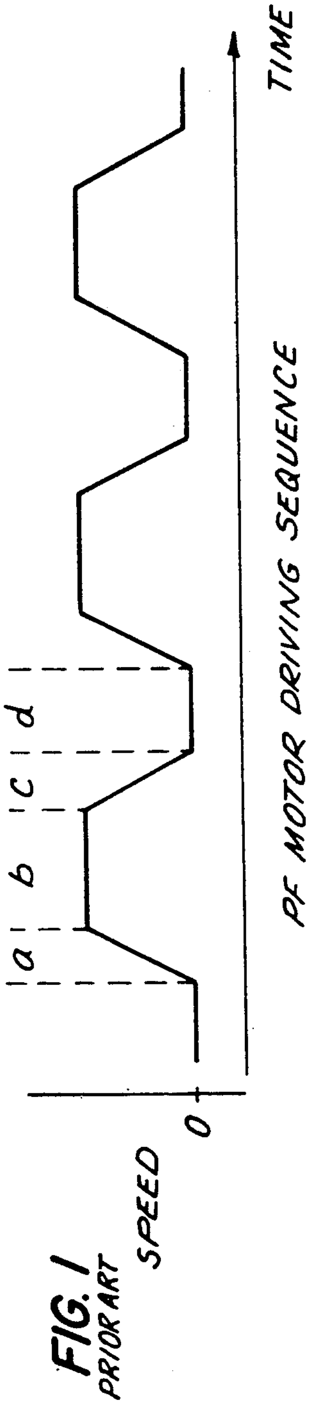
FIG. 1 PRIOR ART
FIG. 1 is a graph of the driving sequence of a PF motor in accordance with the prior art.
Figure 2:
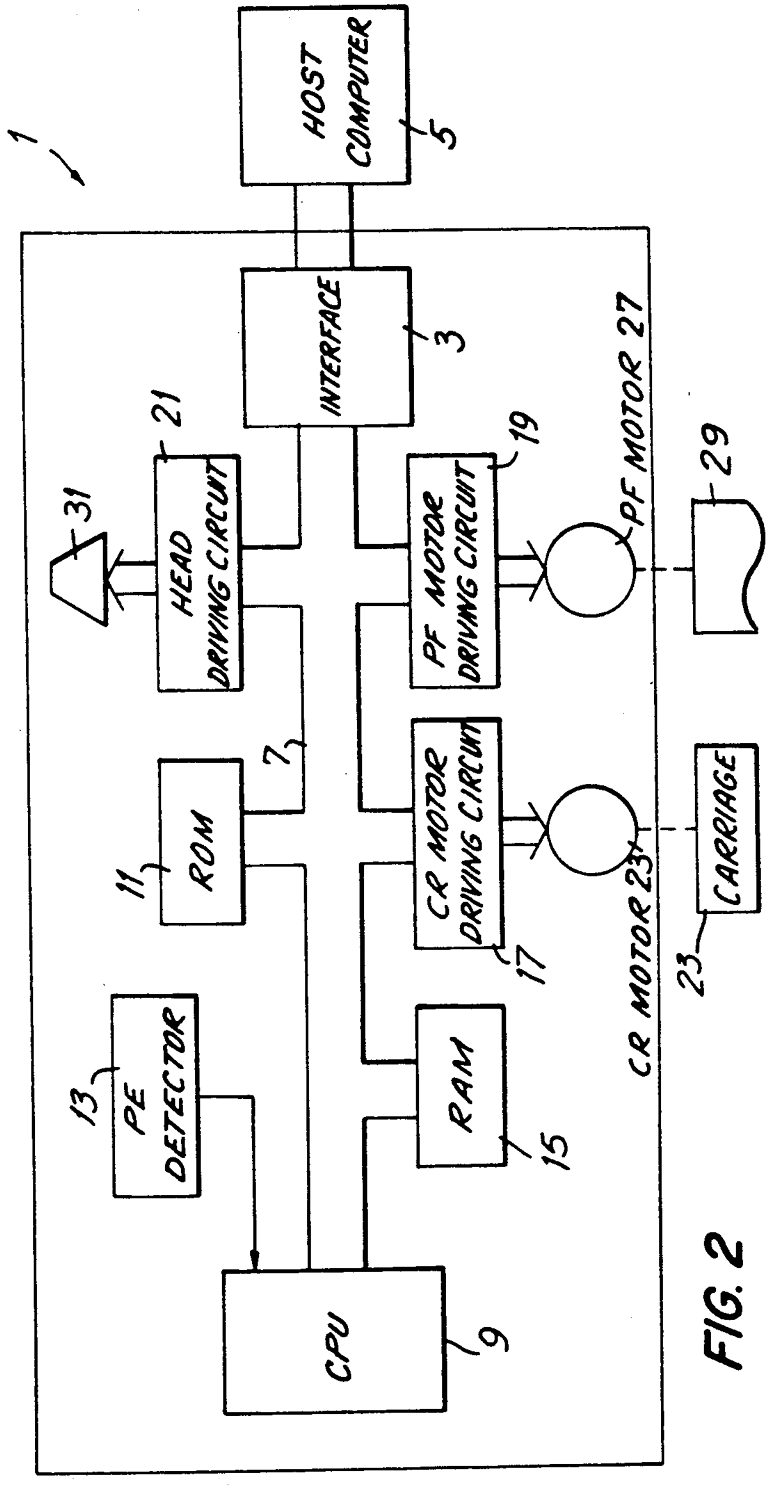
FIG. 2 is a block diagram of a printer control constructed in accordance with the invention.

A printer control device, generally indicated as 1, constructed in accordance with the invention, is shown in FIG. 2. Printer control device 1 is connected to an external host computer 5 by an interface 3. Print control device 1 includes a CPU 9 coupled to interface 3 by an address and data bus 7. Bus 7 also couples CPU 9 to a ROM 11 and a RAM 15. A paper presence ("PE") detector 13 outputs a PE signal indicating the presence or absence of paper in the printer.

CPU 9 controls printing in accordance with a control program stored in ROM 11. Print data and print control commands for controlling paper feed, carriage movement and other functions are output by host computer 5. This data is stored in interface 3 or RAM 15. During printer control, CPU 9 first reads and interprets the data found in interface element 3 and if necessary, refers to a signal from the PE detector 13 as well as various data for printing control which were previously stored in ROM 11 or RAM 15. Then, CPU 9 performs computations in accordance with the control program based on the data and delivers a command to a CR motor driving circuit 17, a PF motor driving circuit 19 and a head driving circuit 21 through bus 7 for controlling each of these circuits based upon the computation.

CR motor driving circuit 17 drives a CR motor 23 in accordance with commands from CPU 9 to move carriage 23. PF Motor driving circuit 19 drives a PF motor 27 for feeding paper 29. CR motor 23 and PF motor 27 are step motors allowing the amount of carriage movement and the amount of paper feed to be determined by the number of steps of each motor. Head driving circuit 21 drives a print head 31 mounted on carriage 25 to conduct printing. Printing is conducted during the movement of carriage 25 and paper 29 is fed when carriage 25 stops.

Figure 3:
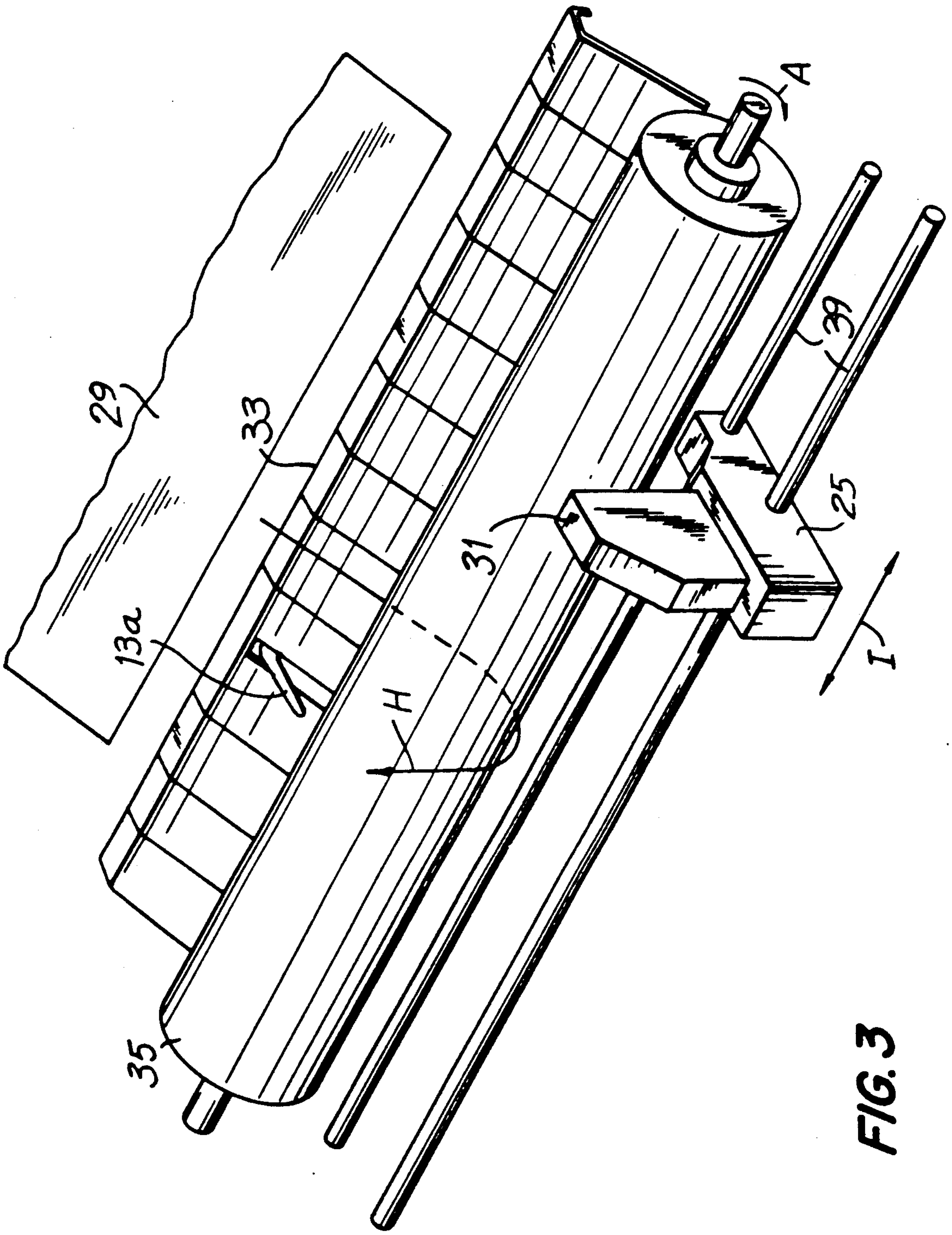
FIG. 3 is a perspective view of a printing head, platen and PE detector constructed in accordance with the invention.
Figure 4:
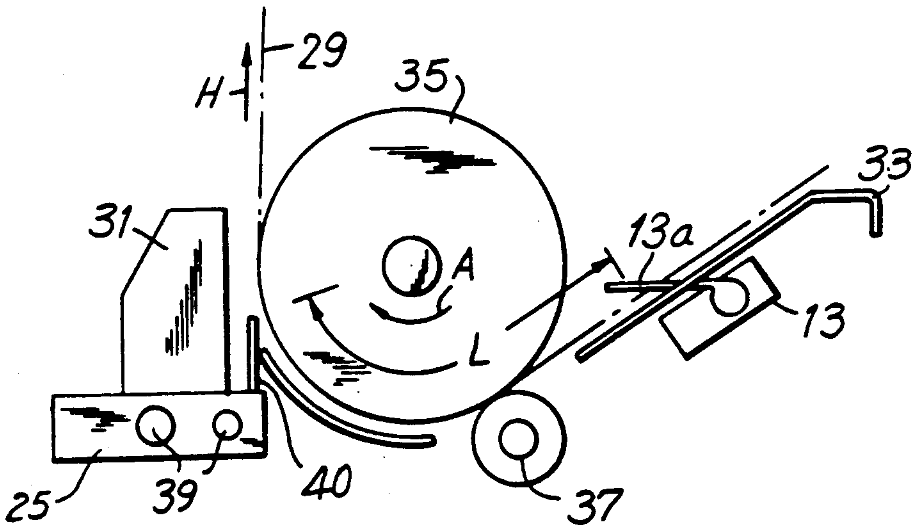
FIG. 4 is a side elevational view of a printing head, platen and PE detector constructed in accordance with the invention.

As seen in FIGS. 3 and 4, a platen 35 is rotatably mounted within the printer. Carriage 25 is mounted on guide rods 39 adjacent platen 35 and performs reciprocal movement in the direction of arrows I along platen 35. Print head 31 is mounted on carriage 25 in facing relationship with platen 35. A paper guide 33 is disposed on the opposed side of platen 35 across a distance from platen 35. A detection pin 13a for detecting the presence or absence of paper extends through paper feeding guide 33 and is coupled to PE detector 13. A paper feeding roller 37 abuts platen 35 and cooperates with platen 35 to feed paper 29 through the printer.

Paper 29 is inserted in the direction of arrow H between platen 35 and paper feeding guide 33 in the direction of paper roller 37. Paper roller 37 traps the paper between paper roller 37 and platen 35 to feed paper 29 towards print head 31. Platen 35 is rotated in the direction of arrow A by PF motor 27. A line pitch previously stored in RAM 15 as the number of steps PF motor 27 must advance each line is utilized during the feeding. The actual paper feed amount is specified by a paper feed control command output by host computer 15.

In an exemplary embodiment, PE detector 13 is a microswitch. PE detector 13 is positioned on the back side of paper feeding guide 33 so that detection pin 13a projects through paper feeding guide 33 within the paper feed path. When paper 29 is present, detection pin 13a is depressed causing PE detector 13 to output a signal corresponding to paper 29 being present. When paper 29 is fed through the printer, and the trailing end of paper 29 passes detection pin 13a, the output of PE detector 13 changes from a paper present signal to a paper absent ("PE") signal.

When the PE signal is produced, there still remains a printable region of paper on paper 29 which may be utilized for printing. This region is defined by a distance L corresponding to the distance along paper 29 extending from detection pin 13a to a presser plate 40 positioned just before print head 31. The distance L is an override amount and has a fixed value dependent upon the relative positioning of the PE detector 13 and presser plate 40. This override amount L may be converted into a number of steps of PF motor 27 and prestored either in ROM 11 or RAM 15.

The number of lines which may be printed within the override distance L differs in accordance with the line pitch and with the bottom margin to be left at the trailing end of paper 29. The data for setting the line pitch and margin width together with data on the number of line characters, intercharacter pitch, character magnification and the like comprise the format data for printing. This format data is input to print control 1 from host computer 5 prior to the inputting of the data for executing a printing operation even including printing data and printing control commands. The format data is transmitted from interface 3 to CPU 9 and then written into an exclusive area of RAM 15.

Figure 5:
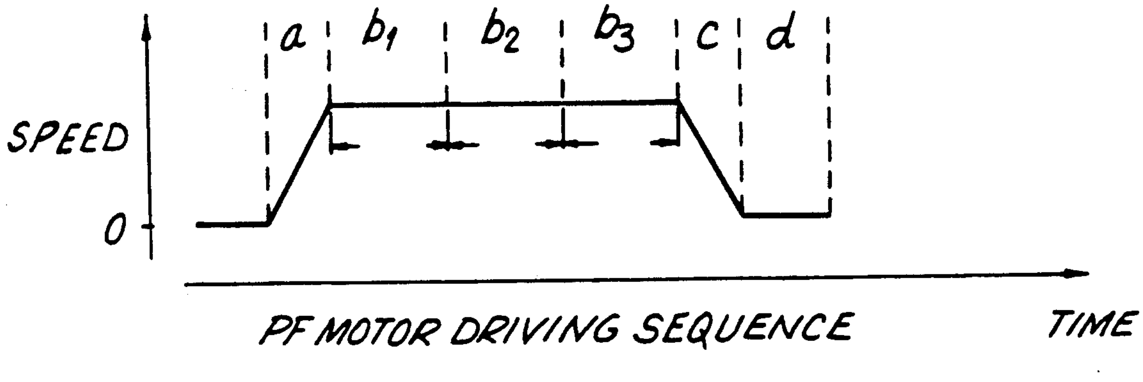
FIG. 5 is a graphical representation of the driving sequence of a PF motor in accordance with the invention.
Figure 6:
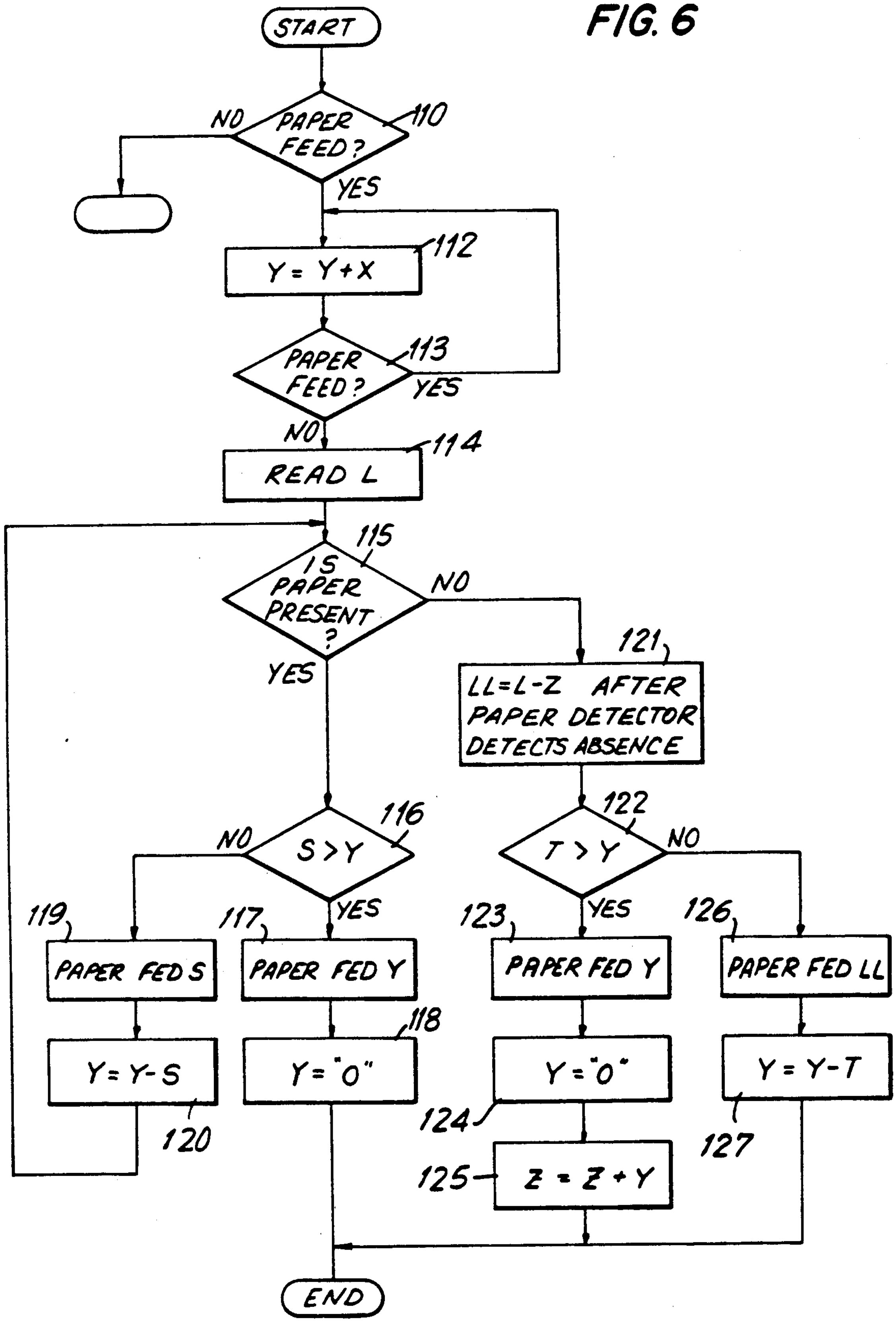
FIG. 6 is flow chart of the processing of a CPU in accordance with the control device of the present invention.

Reference is now made to FIGS. 5 and 6 where an operation of print control device 1 is detailed. Paper feed control commands are output by host computer 5 at three distinct times. Paper feed amounts corresponding to each of these separate commands are denoted by F1, F2 and F3. These control commands are first stored in the interface 3 and then read out by CPU 9. CPU 9 executes an arithmetic process which will be described in connection with the flow chart of FIG. 6 to determine a paper feed amount to be executed. When a printable region remains on paper 29, even after all of the paper feed amount X1, X2, X3 specified by the control commands F1-F3 are executed, the sum of the feed amounts X1+X2+X3 of the specified paper feed amounts is determined and represents the paper feed amount to be executed. In contrast, when no print region remains, the override amount L is determined as the paper feed amount to be executed. Subsequently, CPU 9 causes PF motor 27 to execute the calculated paper feed amount in a single paper feed sequence consisting of acceleration, constant speed operation and deceleration. As seen in FIG. 5 specified paper feed amounts X1, X2 and X3 represented as time periods b1, b2 and b3 are executed during a single sequence so that the necessary paper feed amount is completed in a short time.

CPU 9 performs an arithmetic process as shown by the flow chart of FIG. 6. CPU 9 receives a print control command and first determines whether the print control command is a paper feed control command in a step 110. The print control command may include control commands for printing and carriage movement in addition to paper feed commands. When the received control command is one of printing and carriage movement, the print control switches over to other routines for controlling printing and carriage movement. When the received command is the paper feed command, a value Y corresponding to an unexecuted amount of the paper feed values previously stored in RAM 15 is read and a paper feed amount X specified by the control command is added to the unexecuted paper feed amount Y and a sum Y+X is newly stored in RAM 15 as an updated value of the unexecuted paper feed amount Y in a step 112. When print control is first started, the unexecuted paper feed amount Y is initialized at a value of 0. Therefore, a paper feed amount X1 specified by the first paper feed control command F1 is the unexecuted paper feed amount Y.

CPU 9 receives a subsequent print control command and determines whether it is a paper feed control command in a step 113. If it is a paper feed control command, step 112 is repeated. In this way, step 112 is repeated by the number of paper feed control commands. As a result, the unexecuted paper feed amount Y becomes the accumulated addition value X1+X2+X3 of the paper feed amounts X1, X2 and X3 specified by three successive control commands F1, F2 and F3. When the processing of step 112 ends on the last paper feed control command, the result of step 113 becomes NO because the next control command is not a paper feed command and the entire process is advanced to step 114. In step 114, the override amount L previously stored in ROM 11 or RAM 15 is read. The output of PE detector 13 is monitored to determine whether or not paper is present in a step 115.

When the output value of PE detector 13 indicates that paper is present, a residual amount S of the print region is compared with the unexecuted paper feed amount Y in step 116. Residual amount S of the printable region is the value obtained by subtracting the length of the bottom margin previously stored in RAM 15 from the override amount L when it is indicated that paper is present. The residual amount S of the printable region insures that a printable region remains on paper 29 even after the paper has been fed a feed amount equal to the residual amount S.

If the comparison conducted in step 116 indicated that the number of line pitches of the residual amount S of the printable region is larger than the unexecuted paper feed amount Y, the paper is fed an amount equal to the unexecuted paper feed amount Y in a step 117. Some printable space will remain after the paper is fed the unexecuted paper amount Y and the unexecuted paper feed amount Y is executed in step 117. The unexecuted paper feed amount Y is then returned to 0 in a step 118 ending the series of processing as the entire length of paper has now been fed.

Where the number of line pitches of the residual amount S of the printable region is less than or equal to the executed paper feed amount Y, including the occasions when the value of S is negative due to the bottom paper margin being larger than the override amount L, the possibility arises that the paper feed exceeds the printable region or that paper 29 slips off the platen during paper feed of the unexecuted paper feed amount Y. Accordingly, to prevent this from happening, the paper is only fed by the residual amount S, of the printable region in a step 119 then an executed paper feed amount S is subtracted from the unexecuted paper feed amount Y and the residual amount, Y−S, is stored in RAM 15 as an updated value of the unexecuted paper feed amount Y in a step 120 and then the process is returned to step 115. The paper is repeatedly fed the residual amount S, of the print region until the unexecuted paper feed amount Y becomes less than the residual amount S of the printable region. When unexecuted amount Y becomes less than residual amount S steps 117 and 118 are performed and this routine is ended. Additionally, if the output of PE detector 13 changes from an indication of paper present to an indication of paper being absent during this process, the entire process is transferred to the processing which occurs when paper is absent.

When the output of PE detector 13 indicates that paper is absent in step 115, the process is advanced to step 121 where a residual override amount LL is calculated. Residual override amount LL is the actual space remaining on paper 29 and is determined by subtracting the total paper feed amount Z which has already been executed during the execution of override amount L after the output of PE detector 13 has switched to a paper absent indication. The total paper feed amount Z is calculated in a step 125 and stored in RAM 15 during the preceding paper feeding. After the calculation of the residual override amount LL, the residual amount T of printable space is determined based upon the amount LL and is compared with the unexecuted paper feed amount Y in a step 122. The residual amount T of printable space is the amount of printable space actually remaining on paper 29 and is determined by subtracting the bottom margin prestored in RAM 15 from the residual override amount LL.

When the number of line pitches of residual amount T of the printable region is larger than the unexecuted paper feed amount Y, the paper is fed the unexecuted paper feed amount Y in a step 123. The unexecuted paper feed amount Y which is currently being executed is added to the total paper feed amount Z already executed after PE detector 13 indicates paper absent. An addition value Z+Y thus obtained is stored in RAM 15 as an updated value of the already executed paper feed amount Z in a step 125. The total feed amount Z having already been executed is cleared to 0 when printing is just beginning. Once step 125 is executed, this sub-routine is ended.

When the number of line pitches of the residual amount T of the printable region is less than the unexecuted paper feed amount Y, even including the negative valued T when the bottom margin is greater than the residual override amount LL in step 112, feeding of the paper by the unexecuted paper feed amount Y results in feeding paper beyond the printable region of paper 29 or the slipping of paper 29 off platen 35 during paper feeding. Accordingly, in this situation the paper is fed by the residual override amount LL and paper 29 is discharged above platen 35 in a step 126.

In accordance with these specifications, the print control operation is immediately stopped without executing this paper discharge. Then, a substantial paper feed amount corresponding to the residual amount of T with a printable paper region of the currently executed paper feeding is subtracted from the unexecuted paper feed amount Y and the value Y−T is obtained and stored in RAM 15 as an updated value of the unexecuted paper feed amount Y in a step 127. This value of the unexecuted paper feed amount Y is executed after the succeeding paper 29 is input. According to specifications, it is determined that the paper feed amount Y−Z is not executed and it is also not executed in the succeeding input paper and the unexecuted paper feed amount T is reset at 0 and the routine is ended.

When paper feed control commands are given successively as described above, the paper feed amount corresponding to each control command is accumulated and a judgment is made as to whether there is a departure from a paper printable region when feeding paper in accordance with the accumulated value. When it is judged that there is no departure from the printable region, the paper is fed by the accumulated value in one paper feed sequence including acceleration, constant speed operation and deceleration of the PF motor. Accordingly, the PF motor is accelerated and decelerated only once improving the paper feeding speed.

In the embodiment described above, several of the variables discussed may be given fixed values. For example, the length of the bottom margin is subtracted from the override amount L or the residual override amount LL so as to determine the corresponding residual amount S or T of the printable region. If the bottom margin is a fixed value, a value obtained by subtracting the value at the beginning can be used as the override amount L or the residual override amount LL simplifying the process. Because the host computer is designed to control the bottom margin releasing the printer from controlling that margin, by predetermining the bottom margin, determining whether or not printing can occur is now simply based upon the override amount L or the residual override amount LL. Additionally, while the paper presence is determined as each paper is fed in the above described embodiment, it also possible to remove this operation once the paper is no longer present by regarding the paper as always being absent until a subsequent paper is input.

It will thus be seen that the objects set forth above, among those made apparent from the preceding description are efficiently attained and, since certain changes may be made in carrying out the above method and in the construction set forth, without departing from the spirit and scope of the invention, it is intended that all matter contained in the above description and shown in the accompanying drawings shall be interpreted as illustrative and not in a limiting sense.

It also to be understood that the following claims are intended to cover all the generic and specific features of the invention herein described and all statements of the scope of the invention which, as a matter of language, might be said to fall therebetween.

What is claimed is:

1. A paper feed control device for a printer which feeds paper having a trailing end in an amount specified by a plurality of paper feed control commands, the printer having a paper presence detecting means for indicating when the trailing end of the paper within the printer passes said detecting means, the paper having a first printable region at the trailing end thereof determined at the time when the detecting means switches from an indication of a paper presence to an indication of a paper absence, comprising:

- calculating means for receiving said paper feed control commands and for calculating an accumulated value of the paper feed amounts specified by the plurality of paper feed control commands in response thereto;
- estimating means for determining the presence or absence of a sufficient remaining second printable region at the trailing end of said paper based upon the first printable region at the trailing end of said paper and the accumulated value when the paper is fed by an amount corresponding to the accumulated value; and
- paper feeding means for feeding the paper by the accumulated value when a sufficient remaining second printable region at the trailing end of the paper is determined to be present, and feeding the paper by an amount in accordance with the first printable region at the trailing end of said paper when no sufficient remaining second printable region is present.

2. The paper feed device of claim 1, wherein the estimating means determines a sufficient remaining printable region to be present when the second printable region at the trailing end of the paper is larger than the accumulated value when an output of the detecting means indicates the presence of paper, as well as when the value obtained by subtracting the total amount of paper fed from the first printable region at the trailing end of the paper when the detection means indicates an absence of paper is larger than the accumulated value when an output of the detecting means indicates the absence of paper.

3. The paper feed control device of claim 1, wherein the paper feeding means feeds paper in an amount equal to the first printable region at the trailing end of the paper when the output of the detecting means indicates the presence of paper, and feeds paper in the amount necessary to discharge the paper from the printer which is a value obtained by subtracting the total paper feed amount of the paper fed after the output of the detecting means switches to an indication of the absence of paper from the amount equal to the second printable region at the trailing end of the paper, when the output of the detecting means indicates an absence of paper and the estimating means determines that an insufficient remainder is present.

4. A control method for controlling the feeding of paper in a printer which feeds paper in an amount specified by a plurality of paper feed control commands, the printer having detection means for indicating when the trailing end of the paper within the printer passes said detecting means, the paper having a first printable region at the trailing end thereof determined at the time when the detecting means switches from an indication of paper presence to an indication of paper absence, comprising the steps of:

- calculating an accumulated value of the paper feed amounts specified by the plurality of paper feed control commands when these control commands are successively produced;
- determining the presence or absence of a sufficient remaining second printable region at the trailing end of the paper based upon the first printable region at the trailing end of said paper and the accumulated value; and
- feeding the paper by an amount corresponding to the accumulated value when a sufficient remainder of the second printable region at the trailing end of the paper is determined to be present and feeding the paper by an amount corresponding to the first printable region when the remainder at the trailing edge of the paper is determined to be absent.

5. The method of claim 4, further comprising the step of determining the sufficient remaining printable region to be present when the second printable region at the trailing end of the paper is larger than the accumulated value when an output of the detecting means indicates the presence of paper and determining the remaining printable region to be present when the value obtained by subtracting the total amount of paper fed from the first printable region at the trailing end of the paper when the detection means indicates an absence of paper is larger than the accumulated value when an output of the detecting means indicates the absence of paper.

6. The method for controlling the feeding of paper of claim 4, further comprising the step of feeding paper at an amount equal to the first printable region at the trailing end of the paper when the output of the detecting means indicates the presence of paper, and feeding paper in the amount necessary to discharge the paper from the printer, which is a value obtained by subtracting the total paper feed amount of the paper fed after the output of the detecting means switches to an indication of the absence of paper from the amount equal to the second printable region at the trailing end of the paper, when the output of the detecting means indicates an absence of paper and it has been determined that no remainder is present.

* * * * *